Oct. 14, 1952     P. H. GERRITS     2,613,944
STEERING MEANS FOR MOBILE CONVEYANCES
Filed April 5, 1948     3 Sheets—Sheet 1

Inventor
Paul H. Gerrits
By L. B. James
Attorney

Oct. 14, 1952     P. H. GERRITS     2,613,944

STEERING MEANS FOR MOBILE CONVEYANCES

Filed April 5, 1948     3 Sheets—Sheet 2

Inventor
Paul H. Gerrits
By L. B. James
Attorney

Inventor
Paul H. Gerrits
By L. B. James
Attorney

Patented Oct. 14, 1952

2,613,944

UNITED STATES PATENT OFFICE 2,613,944

STEERING MEANS FOR MOBILE CONVEYANCES

Paul H. Gerrits, Appleton, Wis.

Application April 5, 1948, Serial No. 19,074

4 Claims. (Cl. 280—11.19)

This invention relates to mobile conveyances and more particularly to steering means therefor.

The primary object of this invention resides in the provision of steering means for mobile conveyances adapted to eliminate lateral resistance of their main guiding elements when negotiating curves.

Another object of this invention resides in so constructing the chassis and steering means of certain types of ground traversing vehicles that curves are negotiated smoothly without lateral resistance or drag from trailing ground traversing elements of the same.

A further object of this invention resides in the provision of steering means for skates and other types of mobile conveyances having companion or trailing main steering elements adapted to cause the main steering elements thereof to be automatically disposed to smoothly negotiate curves and return to normal straightaway position.

A still further object of this invention resides in so constructing the chassis, the main steering elements and steering means thereon that lateral pressure on opposite sides and approximately at the medial point of the steering means thereof will cause the main steering elements to negotiate curves without lateral drag from those main steering elements while traversing outside arcs of curves or those main steering elements trailing their lead steering elements.

Aside from the foregoing objects, this invention resides in the provision of steering means for roller and dual runner ice skates adapted to not only cause the trailing elements to follow their leading elements but to bank the same so those elements traversing the outside arc of a curve will reduce their pressure against the ground while the inside elements increase their pressure against the ground to establish positive quick turning action in elected directions.

Among the many objects of this invention is the provision of steering means for roller skates and the like adapted to be constructed or assembled so as to be easily operated by individuals of different weights and also to permit various styles of skating thereon.

One of the salient features of this invention resides in so constructing, tempering and assembling of the resilient steering bars that response of the main guiding elements of skates and the like may be set for quick or slow action.

Another of the important objects of this invention is the provision of resilient guide means associated with the main guiding elements of land vehicles adapted to direct the same from a straightaway course to a curved or turning course by deflecting the resilient guiding means approximately at the medial point or between main companion guiding elements so it will assume arcuate configuration.

One of the fundamental features of this invention resides in the provision of steering means connected to the main steering elements of mobile conveyances whereby variations thereof from a straightaway course are obtained by subjecting that element of the steering means to bending action between the ends thereof connected to the main steering elements.

With these and other objects in view, this invention resides in certain novel features of construction and arrangement of elements to be hereinafter more particularly set forth in the specification, illustrated in the accompanying drawings and pointed out in the appended claims and, although this disclosure depicts my present conception of the invention as adapted to the mobile conveyors mentioned, it is to be understood such departures therefrom may be resorted to as come within the scope of the claims.

In the accompanying drawings forming a part of this application:

Figure 1:
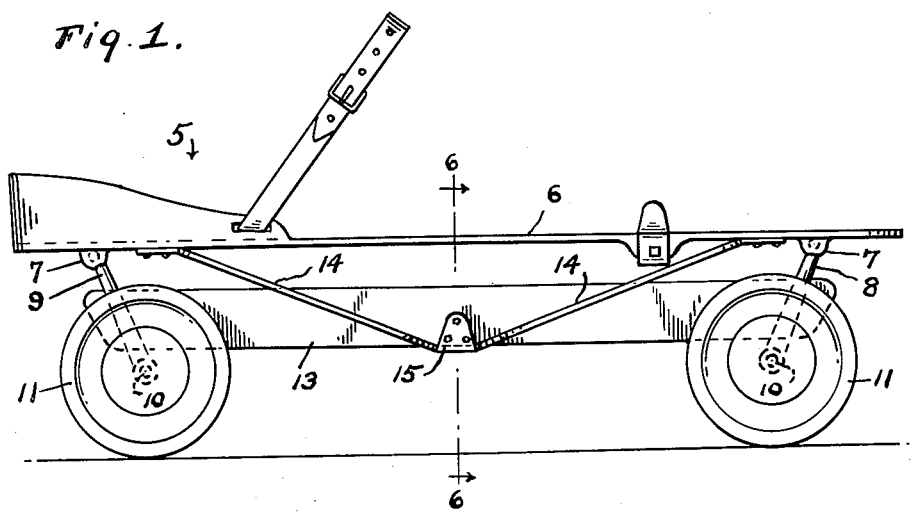
Fig. 1 is a side view of a roller skate constructed in accordance with this invention.
Figure 2:
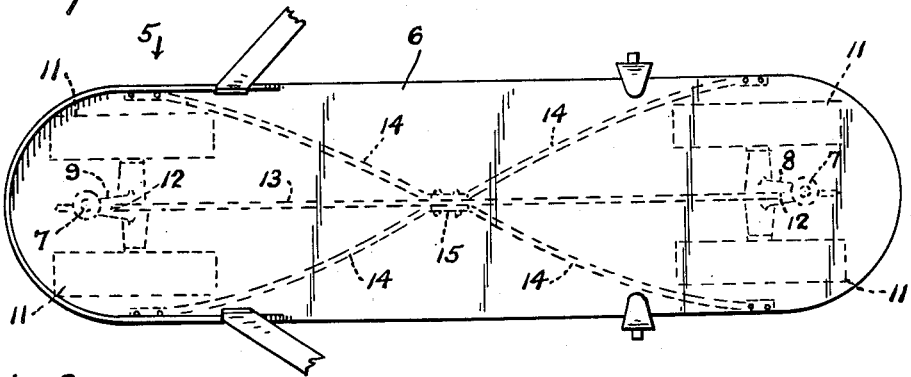
Fig. 2 is a plan view of a roller skate.
Figure 3:
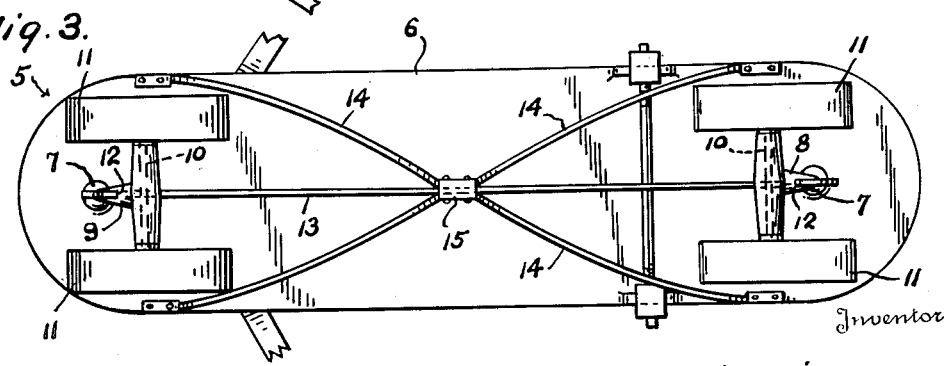
Fig. 3 is a bottom view of a roller skate.
Figure 4:
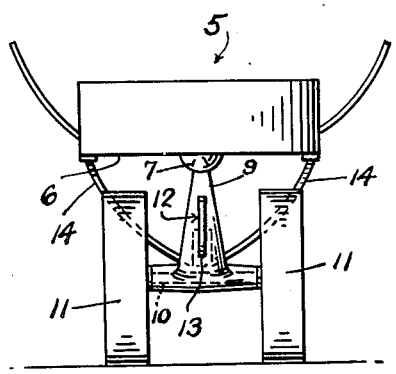
Fig. 4 is a rear view thereof.
Figure 5:
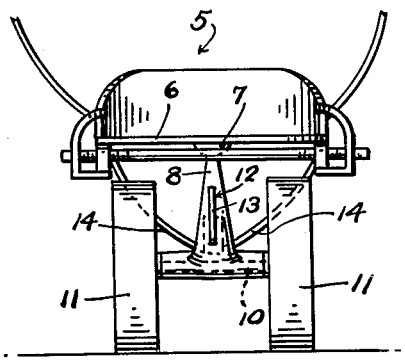
Fig. 5 is a front view of the roller skate.
Figure 6:
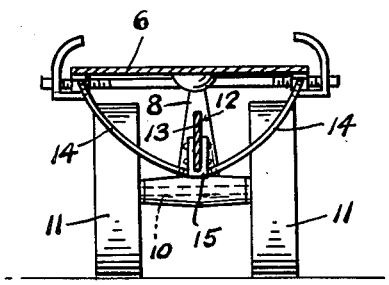
Fig. 6 is a cross sectional view taken approximately on line 6—6 of Fig. 1.
Figure 10:
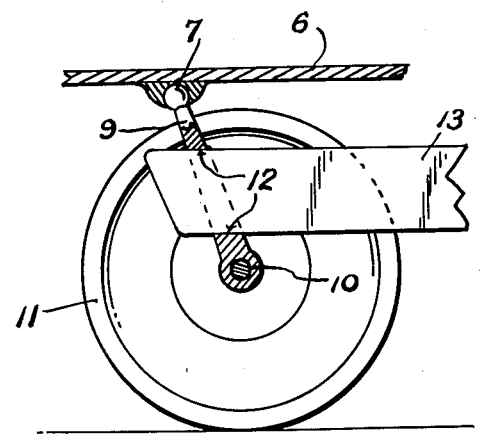
Fig. 10 is an enlarged vertical sectional view taken through the rear end of the skate with parts shown in full lines.
Figure 11:
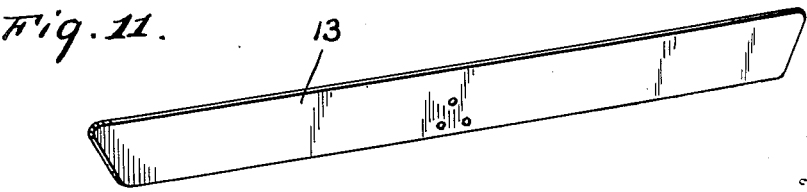
Fig. 11 is a perspective view of the resilient guiding bar.
Figure 12:
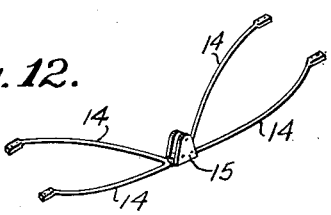
Fig. 12 is a perspective view of the arcuate brace rods.

In the present illustration of this invention the numeral 5 designates, in general, a roller skate consisting of a foot plate 6 to the under surface of which is swivelled, as by universal joints 7, front and rear pillars 8 and 9 having axles 10 at their lower ends to carry rollers 11. Said pillars are provided with longitudinally aligned slots 12 in which opposite ends of a resilient guiding bar 13 are fixed, however, the bar 13 may be otherwise connected to the pillars.

Rigidly secured to the lower surface of the foot plate on opposite sides of a vertical line running longitudinally through the same are downwardly and inwardly inclined substantially U-shaped brace rods 14 having their lower opposed yoke portions secured to a U-shaped clip 15 which is in turn secured to the lower medial portion of the resilient guide bar 13 and their upper ends preferably, but not necessarily, secured to the foot plate at points thereon in the region of the opposite ends of the foot plate by any suitable fastening means, it being within the purview of this invention to otherwise form said U-shaped brace rods and dispose them on the foot plate wherever they will produce like functions. Said U-shaped brace rods being fastened to the lower medial portion of the resilient guide bar 13 prevents undue twisting or lateral displacement of said portion and yet acts to cushion undue shock transmitted to the guide bar from the foot plate.

Figure 7:
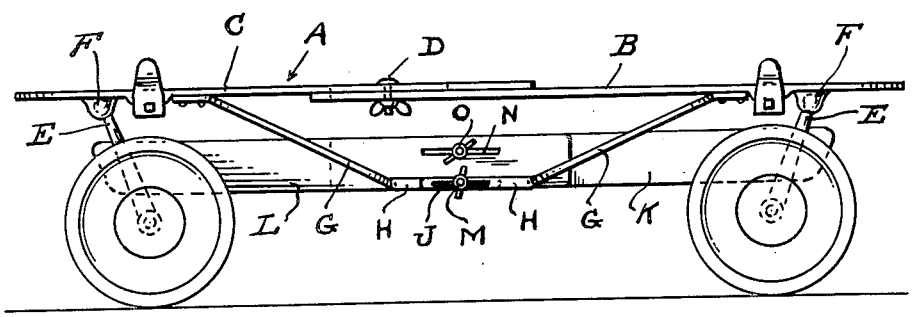
Fig. 7 is a side view of an extensible roller skate constructed in accordance with this invention.

In the modified form of this invention as shown in Fig. 7 of the drawings is a foot plate A consisting of front and rear members B and C adjustably connected together by a fastener D and swivelly supporting pillars E on their lower surfaces adjacent their outer ends by universal joints F. Said pillars are of a structure similar to the pillars 8 and 9 and are utilized for like purposes.

Secured adjacent opposite edges of the aforesaid members of the foot plate on opposite sides of a lateral line running therethrough approximately at a point midway between the opposite ends of said foot plate are downwardly and inwardly directed U-shaped brace rods G having elongated lower portions H provided with slots J through which and companion resilient steering bars K and L extends a fastener M to secure said U-shaped brace rods thereto. Said companion steering bars K and L have their opposite outer ends fixed to the pillars E in any well known manner and their inner end portions provided with registered slots N for permitting longitudinal adjustment thereof in accordance with adjustment of the foot plate through the instrumentality of a fastener O adapted to tighten the inner ends of the same together.

Figure 8:
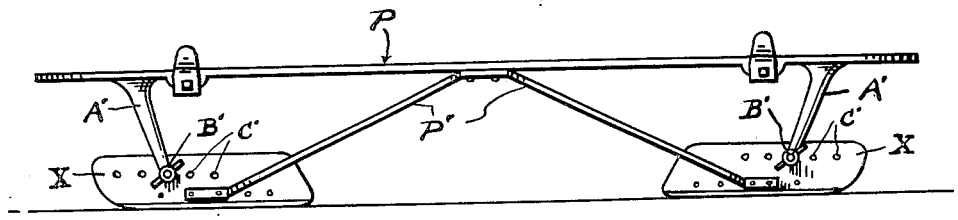
Fig. 8 is a side view of a dual runner ice skate constructed in accordance with this invention.

In the modified form of this invention as illustrated in Fig. 8 of the drawings an ice skate P of the aligned front and rear runner type is shown as being steered by means P' employed with the roller skate disclosed in Figs. 1 to 6 of the drawings, it being within the purview of this invention to utilize adjusting means therewith equivalent to those shown in Fig. 8 of the drawings.

Figure 9:
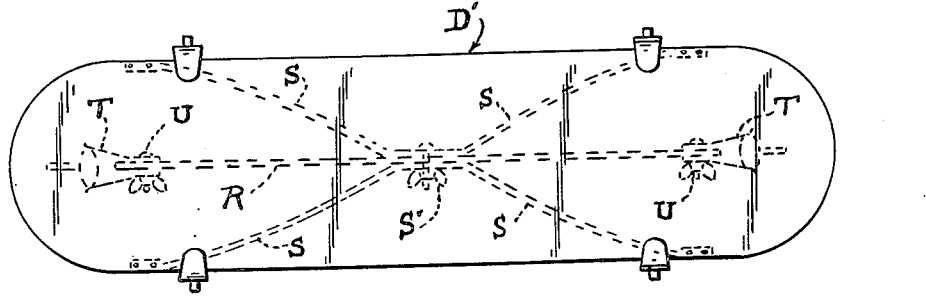
Fig. 9 is a plan view of a single runner ice skate constructed in accordance with this invention.

Disclosed in Fig. 9 of the drawings an ice skate having a substantially resilient runner R is connected approximately at its medial point to the foot plate by U-shaped brace rods S similar to those utilized on the roller skate with opposite ends of the runner adjustably or otherwise connected to pillars T by suitable fasteners U so as to permit the runner to be bent on an arcuate line and thereby negotiate curves without lateral drag.

Although the aforesaid conveyances are herein employed to set forth this invention and advantages thereof, it is to be understood that the same is illustrative of but a limited adaptation of the steering means particularly in that they are operated with equal success when employed to control the main steering elements of all mobile conveyances such as land vehicles.

With this invention fully set forth, it is manifest that steering means for the mobile conveyances mentioned is provided so as to control the main steering elements thereof by deflecting a certain element of the steering means laterally between its ends and thereby cause the main steering elements to smoothly negotiate curves or deviate from straightaway courses without lateral resistance.

Having thus described my invention, what I claim and desire to protect by Letters Patent is:

1. The combination with a mobile conveyance having main steering elements swivelly connected to the lower side of the conveyance and directed inwardly from their swivelled ends and disposed in longitudinal alignment, a resilient steering bar connected in the region of its ends to the main steering elements, U-shaped brace rods rigidly connected to the conveyance at points above and outwardly of opposite sides of the resilient steering bar, and means rigidly securing the yoke ends of the U-shaped brace rods to the resilient steering bar at a point between the main steering elements of the conveyance.

2. The combination with a mobile conveyance having companion main steering wheels swivelly connected in longitudinal alignment thereto, a resilient steering bar connected at its opposite ends to the swivelled supports of the steering wheels, substantially U-shaped brace rods secured at their yoke portions to the resilient steering bar at a point between its ends and on opposite sides of the same with their arm portions extended upwardly and outwardly from said resilient bar, and means securing the outer ends of the U-shaped brace rods to the conveyance on opposite sides of the steering wheels.

3. A roller skate including foot plates, inwardly directed pillars swivelly secured to the lower side of the foot plate adjacent its opposite ends, longitudinally aligned rollers journalled on the pillars, a resilient steering bar extending through and secured inwardly of its ends to the pillars, U-shaped brace rods secured at their lower ends to opposite sides of the medial portion of the resilient steering bar with their ends extending upwardly and curved outwardly on opposite sides of the resilient steering bar, and means securing the ends of the U-shaped brace rods to the foot plate in the region of its side edges.

4. A roller skate including a foot plate, pillars having opposed slots extending therethrough swivelly secured to the lower side of the foot plate, a pair of rollers journalled on the outer ends of each pillar, a resilient steering bar having its end portions extended through the aforesaid slots and secured to the pillars with its medial portion suspended between the same, brace rods of substantially U-shape configuration in plan view having their yoke portions rigidly secured to opposite sides of the resilient steering bar in the region of its longitudinal center and its lower edge portion with their arms extending upwardly on straight lines and outwardly on curved lines to the foot plate, and means securing the outer ends of said arms to the foot plate adjacent its opposite side edges.

PAUL H. GERRITS.

REFERENCES CITED

The following references are of record in the file of this patent:

UNITED STATES PATENTS

| Number | Name | Date |
| --- | --- | --- |
| 287,607 | Arnold | Oct. 30, 1883 |
| 328,332 | Naylor, Jr. | Oct. 13, 1885 |
| 334,281 | Punches | Jan. 12, 1886 |
| 931,064 | Hollar | Aug. 17, 1909 |
| 1,640,134 | Salberg | Aug. 23, 1927 |